Dec. 24, 1968   R. A. PAANANEN   3,418,598
STANDING WAVE SINGLE MODE LASER
Filed Jan. 24, 1964
FIG. 2d
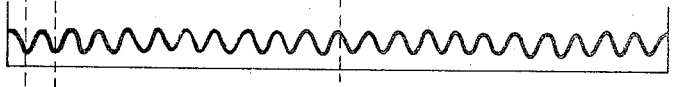
FIG. 2c
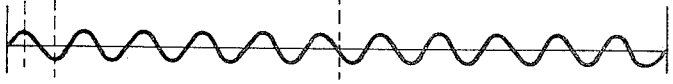
FIG. 2b
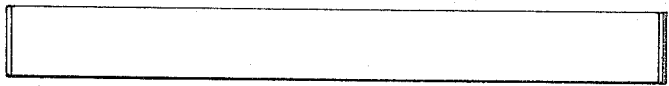
FIG. 2a
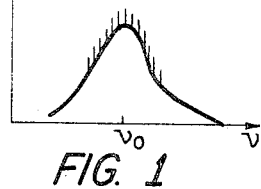
FIG. 1
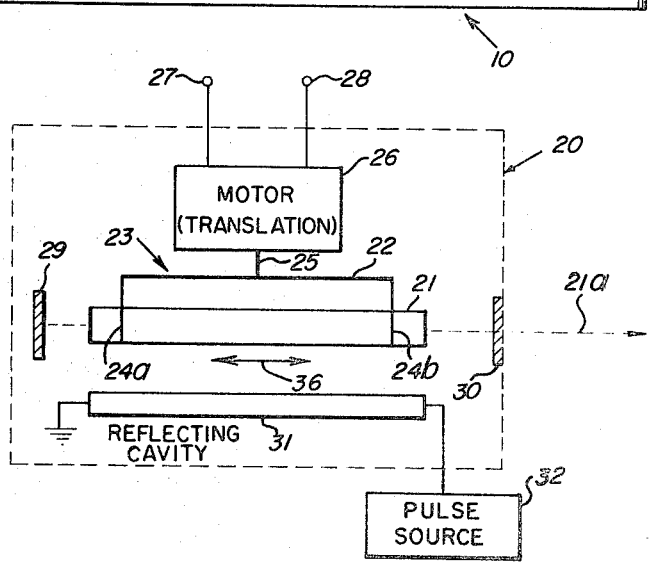
FIG. 3
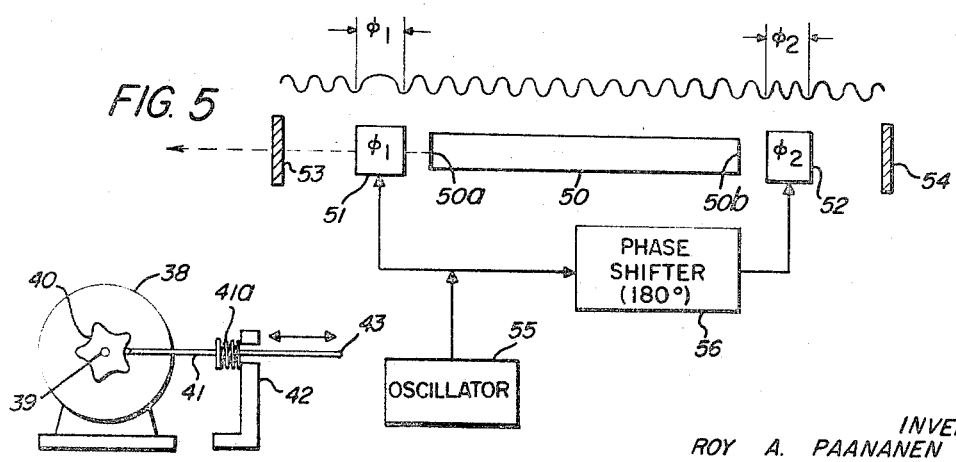
FIG. 5
FIG 4
INVENTOR
ROY A. PAANANEN
BY Donald Brown
ATTORNEY United States Patent Office 3,418,598
Patented Dec. 24, 1968

3,418,598
STANDING WAVE SINGLE MODE LASER
Roy A. Paananen, Concord, Mass., assignor to Raytheon Company, Lexington, Mass., a corporation of Delaware
Filed Jan. 24, 1964, Ser. No. 339,931
5 Claims. (Cl. 331—94.5)

ABSTRACT OF THE DISCLOSURE

A solid state laser wherein spatial vibrations in the inverted states are eliminated by longitudinally moving the laser element or by utilizing a pair of matched phase shifters one at each end of the laser element whereby the element "sees" a varying phase of the electromagnetic wave but the total phase shift in the optical cavity remains constant.

---

This invention relates to coherent electromagnetic radiation generators and, more particularly, to an improved coherent electromagnetic radiation generator which avoids nonuniform spatial distribution of the inverted population during the generation of said radiation by altering the position of maxima and minima of a standing wave pattern which exists within the radiation producing portion of the generator.

It is well known that convetnional solid state lasers, such as a ruby rod silvered at both ends which is placed in a reflecting cavity and pumped by a flashtube coupled to a source of energy, can and do oscillate simultaneously in many modes or frequencies. Additionally, it is known to the art that solid state lasers of the aforementioned type exhibit irregular output spikes which appear to vary in amplitude over wide ranges and, accordingly, do not appear to be related by some damping coefficient. Although, in some applications, multimodes or frequencies are of little significance, other applications such as communications, for example, require an output signal which is substantially a single mode so as to require less bandwidth for transmission of information.

Accordingly, it is the principal object of this invention to provide a new and improved single mode solid state laser or optical maser.

It is a further object of this invention to provide a single mode standing wave solid state laser.

It is an additional object of this invention to provide a coherent electromagnetic radiation generator of the standing wave type which avoids nonuniform spatial distribution of inverted population states during the generation of said radiation.

In accordance with this invention, a standing wave single mode solid state laser is provided with means for altering the position of the standing wave pattern which exists within the radiation producing portion of the laser generator in order to avoid nonuniform spatial distribution of the inverted population. In this manner, multimodes or frequencies are suppressed since the ions, such as in chromium, are thus deexcited in a spatially uniform manner.

These and other features of the present invention will become apparent from the following detailed discussion taken in conjunction with the accompanying drawings in which:

FIG. 1 is a diagram showing the emission coefficient and longitudinal modes of a standing wave solid state laser rod;

FIG. 2a is a standing wave solid state laser rod which is coated with reflecting surfaces at both ends;

FIG. 2b shows the field distribution of the first unstable longitudinal mode of FIG. 2a;

FIG. 2c shows the distribution of the inverted population for the case where only the mode of FIG. 2b oscillates;

FIG. 2d shows the field distribution of a second unstable longitudinal mode of the rod of FIG. 2a;

FIG. 3 shows an electromagnetic radiation generator including a mechanical means for altering the standing wave pattern within a ruby rod;

FIG. 4 is one device for accomplishing the mechanical motion required for FIG. 3; and FIG. 5 is an electromagnetic radiation generator including means for optically varying the standing wave pattern within a solid state electromagnetic radiation producing rod.

It has been suggested that the observed multimode spectra of a standing wave solid state laser can be explained as being due to slow spatial cross relaxation. In the normal laser comprising a ruby rod, made into a resonant cavity by providing mirrors at both ends, there are many principal or axial modes observed in the output which have a frequency spacing equal to the velocity of light times the inverse of twice the length of the crystal. In addition to these principal modes, there are unresolved off-axes modes which differ in frequency only in the order of megacycles and whose presence is revealed by the fact that the angular beam spread is considerably larger than the expected diffraction limit.

The spectrum of the output of the usual standing wave solid state laser is as shown in FIG. 1. In this figure, some of the modes of the optical cavity are shown schematically. As the pump level is raised, the mode in the center of the line will reach oscillation threshold first. If the spectral cross relaxation was infinitely fast enough, the line shape would be retained because the gain of this mode would be at infinity while other modes would have only a finite gain and thus could not oscillate. However, since in most crystals the line broadening is due to the influence of lattice vibrations, the energy can be transferred within the line in a time equal to the period of typical lattice vibrations. Thus, it is believed that the observed output is due to slow spatial cross relaxation and not due to slow spectral cross relaxation.

This is further explained in conjunction with FIGS. 2a through 2d. FIG. 2a shows a solid state laser rod 10 coated at each end with a reflecting material so as to turn this rod into a resonant cavity. If we now assume that one axial mode reaches threshold, then we have a standing wave of a particular wavelength as shown, for example, in FIG. 2b, set up within the rod shown in FIG. 2a. The standing wave thus created has nodal planes halfwavelengths apart and in parallel with the reflecting surfaces. The induced emision thus produced by this standing wave is zero at the nodal planes and maximum between. If we assume that no excitation can diffuse spatially, an inverted energy population having a maximum at the nodal planes and minima therebetween occurs as is shown in FIG. 2c. This distribution of the energy population is unfavorable to maintain the first described oscillating mode since where the electric field of the mode is maximum, the inverted population is a minimum, or at best, substantially reduced. Therefore, a second axial mode in FIG. 2d which has a wavelength exceeding that of the first axial mode by half a wavelength more will now reach threshold and it will grow in amplitude and oscillate, for, in traversing both modes we find that when we arrive at line 11 that it is maximum for the second mode, minimum for the first mode and maximum for the inverted population. Thus, since the maximum of the electric field of the second mode occurs where there is maximum in the density of the excited states, this mode will thus have more gain than the first mode which is already oscillating and, therefore, will also go into oscillation.

This is based, of course, upon the assumption that the two frequencies of the first and second modes are sufficiently close, for otherwise, the dependence upon the location of any frequency in the line is also of importance. This situation also occurs for the third, fourth, fifth, etc., modes.

It should be noted that the above discussion is concerned solely with the longitudinal modes. It is thus apparent that it is necessary in order to prevent the occurrence of multiple modes that stationary standing wave patterns within the laser rod be avoided.

Referring now to FIG. 3, there is disclosed an electromagnetic radiation generator including a motor which provides means for altering the standing wave pattern within a ruby rod, thereby suppressing multimodes so as to achieve single mode laser operation. The laser system comprises a reflecting cavity 20, shown dotted, preferably made of metallic material having highly reflective surfaces, which may be of an elliptical shape, and a solid state ruby rod 21, which is mechanically coupled to arms 24a and 24b of a linkage assembly 23. Linkage assembly 23 may be fabricated from aluminum, for example. Arms 24a and 24b are coupled to a connecting element 22 of the linkage which, in turn, is coupled by way of linkage 25 to a motor 26. Motor 26 is provided energy at terminals 27 and 28 in order to produce motion of the rod 21 within the cavity 20 as shown by the two-headed arrow 36. The ends of the rod 21 are coated with an antireflection material such as magnesium fluoride. Positioned in proximity to the ends of the rod 21 are two dielectric coated mirrors 29 and 30 which act as a Fabry-Perot resonant cavity at the wavelength transmitted by the ruby rod 21. The mirrors may be positioned, for example, at a distance of one to two inches from the end of the rod. Mirror 29 is fabricated such that it has a substantially 100% reflectivity at the ruby wavelength and mirror 30 has substantially 30% transmittivity at the ruby wavelength. By activating the motor 26, the ruby rod 21 is displaced longitudinally in the direction of the arrows 36 so that various excited chromium atoms see different parts of the standing electromagnetic wave in time intervals reasonably small compared with their lifetime. In this manner, it is possible to avoid the maximum and minimum inverted population states within a ruby and thus provide single mode operation and regular spiking or uniform decayed response.

The electromechanical device which would be utilized may comprise the structure shown in FIG. 4 wherein there is a motor 38 having mounted on a shaft 39 thereof a cam 40 which is coupled to the follower 41 supported by member 42. The follower 41 is yieldably retained in physical engagement with cam 40 by a spring device 41a. The ruby rod linkage, shown as 25, can be coupled to the follower 41 at point 43. Thus, the cam 40 and spring device 41a provide reciprocating mechanical motion of the follower 41 and consequently of the ruby rod 21 connected thereto in the direction of the arrows shown in FIGS. 3 and 4.

There is also shown in the cavity 20 of FIG. 3 a flashtube 31 which is coupled to an energy source 32 such as a bank of capacitors which provide a pulse of energy to activate the flashtube 31. Upon activation, the flashtube 31 emits a sharp burst of light energy which produces an inverted population within the ruby rod 21. Light emission then occurs as the inverted population falls back to lower energy states. Light energy thus obtained then oscillates within the resonant cavity comprising the rod and the two mirrors 29 and 30 until there is a significant energy build up, at which time a burst of coherent energy is emitted from the rod 21 in the form of a beam 21a of coherent radiation. This beam then passes through the mirror 30.

In order to obtain the aforementioned maximum and minimum dislocation so as to uniformly affect the population within the rod 21, the displacement should be about one-quarter of a wavelength at the ruby frequency in a time less than about $10^{-7}$ secs., where $10^{-7}$ is approximately the relaxation lifetime of the excited atoms. For example, at $5 \times 10^{-8}$ secs. the velocity $$V = \frac{S}{t} = \frac{1.75 \times 10^{-7}}{5 \times 10^{-8}} = 3.5 \text{ meters per second}$$

S is equal to one-quarter of a wavelength at the ruby oscillation frequency and $t$ is a time which is chosen to be less than the relaxation lifetime of the excited atoms. With velocities in this order, the rod 21 can be moved in a manner so as to uniformly affect the inverted population states and thereby suppress multimode oscillations.

Other techniques which may be utilized for mechanically moving the rod 21 could comprise a voice coil having an electromagnetic portion thereof coupled to one end of the rod 21 with energy being provided to the coil by an audio frequency oscillator. In this manner, a rod such as rod 21 supported on mounts which permit longitudinal motion may be vibrated in accordance with an audio signal which, when coupled to one end of the rod 21, will apply a mechanical force to move the rod 21 as shown by the arrows in FIG. 3.

Referring now to FIG. 5, there is disclosed an electromagnetic radiation generator including means for optically varying the standing wave pattern within a solid state radiation producing rod. This device comprises a rod 50, such as a ruby rod, having its ends 50a and 50b covered with an antireflection material, such as magnesium fluoride. Positioned adjacent to both ends 50a and 50b are two optical phase shifters 51 and 52. The optical phase shifters may comprise the structure shown in "The Proceedings from the Symposium on Optical Masers," Polytechnic Institute of Brooklyn, Apr. 16-19, 1963, in the article "Piezoelectric Laser Modulator," by B. O. Seraphin, D. B. McCauley, and L. G. LaMarca on page 636, FIGURE 2. This structure comprises a quartz crystal to which there are coupled two electrical contacts. By applying an electrical signal across the quartz crystal, such as by way of an oscillator, the phase shift of a light beam passing through the device can be altered. Positioned adjacent and on either side of the phase shifters 51 and 52 are two mirrors 53 and 54, respectively. These mirrors act as a portion of a Fabry-Perot resonant cavity structure when combined with the rod 50. Mirror 53 is made partially transmissive so as to permit the transmission of energy as shown by the arrows. Energy is provided to alter the phase of the matched phase shifters 51 and 52 by an oscillator 55 which could operate at a frequency of 1.43 mc. Energy is directly applied to phase shifter 51 and energy is applied to phase shifter 52 by way of an electrical phase shifter 56 which alters the phase of the oscillator frequency 55 fed to phase shifter 52 by 180°. In this manner, phase shifters 51 and 52 are simultaneously fed by a single source of frequency but by opposite polarity signals. Thus, the standing wave, as shown in FIG. 5, is altered such that the ruby sees a varying phase of the standing wave pattern but the total phase shift of the optical cavity lying between the mirrors 53 and 54 remains constant since phase shifter 51 provides a phase which increases when the phase provided by phase shifter 52 decreases and vice versa. Phase shifters 51 and 52 are also coated with antireflection material such as magnesium fluoride. Thus, there has been provided an alternate structure for spatially varying the position of the maximum and minimum of a standing wave within a standing wave laser system thereby providing a device which is capable of operating at a single mode with regular spiking.

Since many changes could be made in the above-described construction and many apparently widely different embodiments of the present invention could be made without departing from the scope thereof, it is maintained that all matter contained in the above description or shown in the accompanying drawings should be interpreted as illustrative and not in a limiting sense.

What is claimed is:

1. A solid state electromagnetic generator comprising a radiation producing means, a resonant cavity coupled to said radiation producing means, means for altering the energy states of the atomic population within said radiation producing means, said altered population producing a standing electromagnetic wave within said cavity, means for transmitting electromagnetic radiation from said generator, and means for subjecting the radiation producing means to a varying phase of the electromagnetic wave while retaining constant the total phase shift in said cavity.

2. A laser system comprising an electromagnetic radiation producing means having at least two radiating surfaces, a pair of stationary mirrors, one of each of said mirrors positioned adjacent to one of said surfaces to form a resonant cavity with said radiation producing means, means for pumping energy into said radiation producing means, means for causing reciprocating movement of said radiation producing means closer and farther away from each of said mirrors, and means for transmitting said electromagnetic radiation.

3. A laser system comprising an electromagnetic radiation producing means having at least two radiating surfaces positioned at right angles with respect to its longitudinal axis, a pair of stationary mirrors, one of each of said mirrors positioned adjacent to one of said surfaces to form a resonant cavity with said radiation producing means, means for pumping energy into said radiation producing means, means for transmitting said electromagnetic radiation, and means for physically reciprocating said radiation producing means along its longitudinal axis thereby positioning said radiation producing means closer and farther away from said stationary mirrors in a predetermined manner.

4. A laser system comprising an electromagnetic radiation producing means having at least two radiating surfaces, a pair of stationary mirrors, one of each of said mirrors positioned adjacent to one of said surfaces to form a resonant cavity with said radiation producing means, a pair of optical phase shifters, one of each of said optical phase shifters positioned between one of said surfaces and one of said mirrors, means for providing electrical energy to said optical phase shifters, and means for transmitting said electromagnetic radiation.

5. A system in accordance with claim 4 including means for providing energy to one of said phase shifters at 180° out of phase from the energy provided to the other of said phase shifters.

References Cited

UNITED STATES PATENTS 3,243,722   3/1966   Billings _____ 331—94.5

OTHER REFERENCES

Free and Korpel: "Laser Emission from a Moving Ruby Rod," Proc. IEEE, vol. 52, page 90, Jan. 6, 1964.

DAVID SCHONBERG, *Primary Examiner.*

P. R. MILLER, *Assistant Examiner.*

U.S. Cl. X.R.

350—150, 160; 332—7.51